United States Patent
Fujiwara et al.

(10) Patent No.: US 7,965,293 B2
(45) Date of Patent: Jun. 21, 2011

(54) IMAGE PROCESSING DEVICE, IMAGE PROCESSING METHOD, AND IMAGE PROCESSING PROGRAM FOR RECONSTRUCTING DATA

(75) Inventors: Yoko Fujiwara, Setagaya (JP); Toshiyuki Mitsubori, Kawasaki (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 0 days.

(21) Appl. No.: 09/934,479

(22) Filed: Aug. 23, 2001

(65) Prior Publication Data
US 2002/0028020 A1   Mar. 7, 2002

(30) Foreign Application Priority Data

Sep. 4, 2000   (JP) ................... 2000-267305
Jun. 22, 2001   (JP) ................... 2001-189865

(51) Int. Cl.
*G06T 11/80* (2006.01)
*G06K 9/56* (2006.01)

(52) U.S. Cl. ........................ 345/467; 345/636
(58) Field of Classification Search .................. 345/636, 345/467; 382/190, 200, 292; 715/520, 246
See application file for complete search history.

(56) References Cited

U.S. PATENT DOCUMENTS

| 5,179,650 A | * | 1/1993 | Fukui et al. | 715/520 |
| 5,201,011 A | * | 4/1993 | Bloomberg et al. | 382/175 |
| 6,466,954 B1 | * | 10/2002 | Kurosawa et al. | 715/520 |
| 6,704,467 B2 | * | 3/2004 | Uchida | 345/619 |
| 2002/0044134 A1 | * | 4/2002 | Ericson et al. | 345/163 |

FOREIGN PATENT DOCUMENTS

| JP | 57-199066 | | 12/1982 |
| JP | 01-185762 | | 7/1989 |
| JP | 03-14184 | | 1/1991 |
| JP | 03-014184 | | 1/1991 |
| JP | 3-176148 A | | 7/1991 |
| JP | 05-342326 | | 12/1993 |
| JP | 09-204511 | | 8/1997 |
| JP | 11-184966 | * | 7/1999 |
| JP | 11-272871 | | 10/1999 |
| JP | 2002-150306 | * | 5/2002 |

OTHER PUBLICATIONS

Second College Edition of The American Heritage Dictionary, 1982, pp. 573 and 911.*
Notice of Reason for Rejection dated Jun. 24, 2008 issued in Japanese Patent Application No. 2001-189865 (with English Translation).
Decision on Refusal in priority application No. JP 2001-189865, decision dated Sep. 24, 2008, and translation thereof.

* cited by examiner

*Primary Examiner* — Jeffery A Brier
(74) *Attorney, Agent, or Firm* — Buchanan Ingersoll & Rooney PC (57) ABSTRACT

Device, method and computer program capable of obtaining from image data document data readable and effectively adherable in a region of definite form without waste. According to the device, method and computer program, a document block containing a specific image such as a headline and a body text is extracted from among image data to be processed, character code is recognized from a character image of the specific image within the document block, the document block is reconstructed in a specific shape, and character code data corresponding to the recognized character code is laid out within the reconstructed document block.

37 Claims, 9 Drawing Sheets

IMAGE PROCESSING DEVICE, IMAGE PROCESSING METHOD, AND IMAGE PROCESSING PROGRAM FOR RECONSTRUCTING DATA

This application is based on Patent Application Nos. 2000-267305 and 2001-189865 filed in Japan on Sep. 4, 2000, and Jun. 22, 2001, the entire contents of which are hereby incorporated by reference.

BACKGROUND OF THE INVENTION

1. Field of the Invention

The present invention relates to an image processing device, image processing method, and image processing program, and more specifically relates to obtaining specific document data by extracting necessary document blocks from image data obtained by reading a document such as a newspaper, magazine and the like.

2. Description of the Related Art

There are times when extraction of data of only a specific document is wanted in a document comprising a full page surface such as, for example, a newspaper, magazine and the like.

For example, Japanese Laid-Open Patent Application No. H9-204511 proposes a device which extracts character images of headlines among image data after reading a document such as a newspaper, magazine and the like to obtain image data, and records the associations of the character code data of headlines obtained in a character recognition process to the extracted character images, and character image data of body text corresponding to the headlines.

Although the device disclosed in this publication can obtain character image data of the corresponding body text by specifying character code data of the headline, disadvantages arise in that the obtained document data are difficult to read because the shape of the document block (document region) in which the document data appears is irregular because the character image data of the body text is used directly in the layout of the document. Moreover, when the obtained document data are adhered to a region of definite form, there is much white space since the shape is irregular, which is inefficient.

OBJECTS AND SUMMARY

An object of the present invention is to eliminate the previously described disadvantages by providing an improved image processing device, image processing method, and image processing program.

Another object of the present invention is to provide an image processing device, image processing method, and image processing program capable of extracting specific document blocks from among image data, and obtaining document data readable and effectively adherable in a region of definite form without waste.

These objects are attained by an image processing device comprising:

extraction means for extracting a document block containing a specific image from among image data to be processed;

recognition means for recognizing character code from the character image within the document block;

reconstruction means for reconstructing the document block in a specific shape; and layout means for laying out character code data corresponding to character code recognized by the recognition means within the reconstructed document block.

In this image processing device, the extraction means may extract a plurality of blocks, and the reconstruction means may arrange the plurality of extracted document blocks into a single block reconstructed to a specific shape.

In this image processing device, the specific image desirably includes a character image of a headline, and a character image of body text corresponding to the headline. In this case it is desirable that headline character arrangement means is further provided for arranging the character code data corresponding to the character image of the headline at a specific position within the reconstructed document block.

In this image processing device, the reconstruction means may also adjust a vertical or horizontal dimension of the document block to a length approximating a natural integer multiple of the length of one column of the multiple columns formed within the document block.

This image processing device also may be provided with file generation means for generating an electronic file storing the character code data laid out by the layout means.

This image processing device also may be provided with a printer for printing the character code data laid out by the layout means on a recording substrate.

This image processing device also may be provided with a reader for reading image data to be processed by optically reading an image of a document.

These objects are further attained by providing an image processing method comprising the steps of:

extracting a document block containing a specific image from among image data to be processed;

recognizing character code from a character image within the document block;

reconstructing the document block in a specific shape; and laying out character code data corresponding to the recognized character code within the reconstructed document block.

These objects are further attained by providing a program for causing a computer to execute image processing comprising the steps of:

extracting a document block containing a specific image from among image data to be processed;

recognizing character code from a character image within the document block;

reconstructing the document block in a specific shape; and laying out character code data corresponding to the recognized character code within the reconstructed document block.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

The embodiments of the present invention are described hereinafter with reference to the accompanying drawings.

Figure 1:
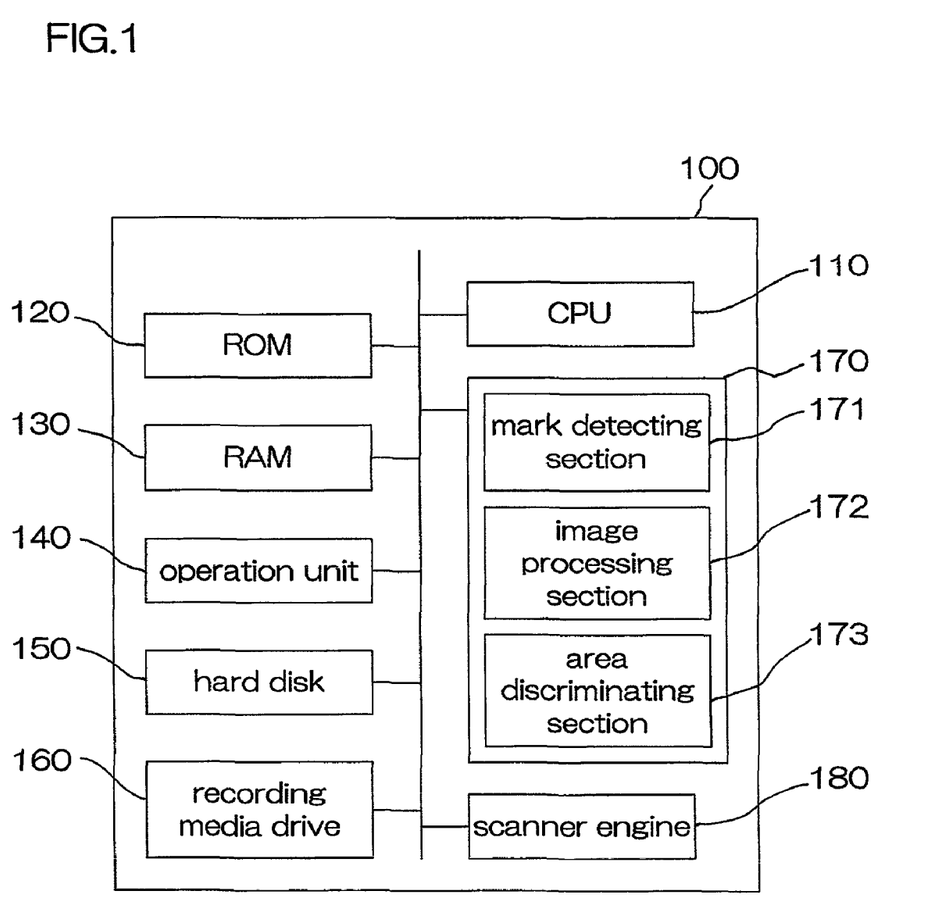
FIG. 1 is a block diagram briefly showing the structure of an image processing device of an embodiment of the present invention.

FIG. 1 is a block diagram briefly showing the structure of an embodiment of the image processing device of the present invention.

Image processing device 100 has a filing function for reading a document such as, for example, a newspaper, magazine or the like, extracting necessary document data from the obtained image data, and storing the data as an electronic file.

The image processing device 100 is provided with a CPU 110, ROM 120, RAM 130, operation unit 140, hard disk 150, recording media drive 160, ASIC 170, and scanner engine 180.

The CPU 110 controls the entire image processing device 100 in accordance with a program.

The ROM 120 stores the control program and data. An image processing program described later is stored in the ROM 120.

The RAM 130 has an area for temporarily storing data and programs, e.g., an area for temporarily storing document image data within a document block (document region) in the image data.

The operation unit 140, although not shown in the drawing, has a touch panel display, input keys or the like.

The hard disk 150 can store an operating system, and various types of application programs. The hard disk 150 also may store generated electronic files.

The recording media drive 160 can read and write various types of data such as an electronic file on various types of removable recording media (e.g., flexible disk, MO disk and the like).

ASIC 170 is provided with a mark detecting section 171, image processing section 172, and area discriminating section 173. The mark detecting section 171 detects a mark representing the position of a specific document block in the image data. The image processing section 172 executes specific image processing such as removing noise from the document image data within the document block. The area discriminating section 173 generates character image data and photographic image data from the document image data.

The scanner engine 180 obtains image data by reading a document.

Figure 2:
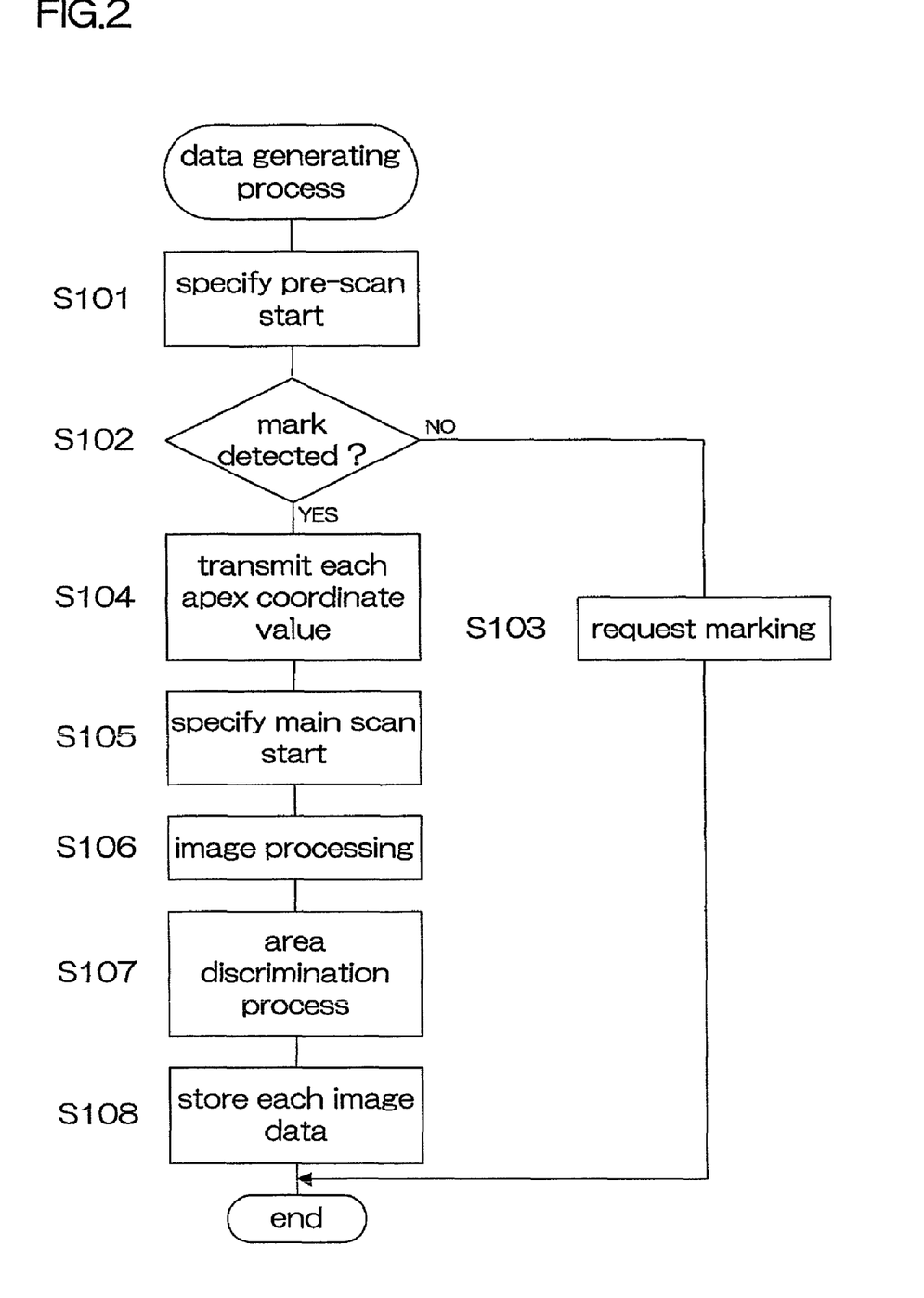
FIG. 2 is a flow chart showing the sequence of the document, character, and photographic image data generation process.

The sequence of the document, character, and photographic image data generating process is described below using the flow chart of FIG. 2. The content of the flow cart of FIG. 2 is stored as a program in ROM 120, and is executed by the CPU 110.

First, in step S101, the start of a pre-scan of a document is specified. In this way the scanner engine 180 optically reads a document comprising the entire surface of a single page, e.g., a newspaper, magazine or the like. The scanner engine 180 executes a pre-scan for an approximate reading of a document, and executes a main scan for detailed reading of the document. Pre-scan image data output from the scanner engine 180 are input to the mark detecting section 171.

Figure 4:
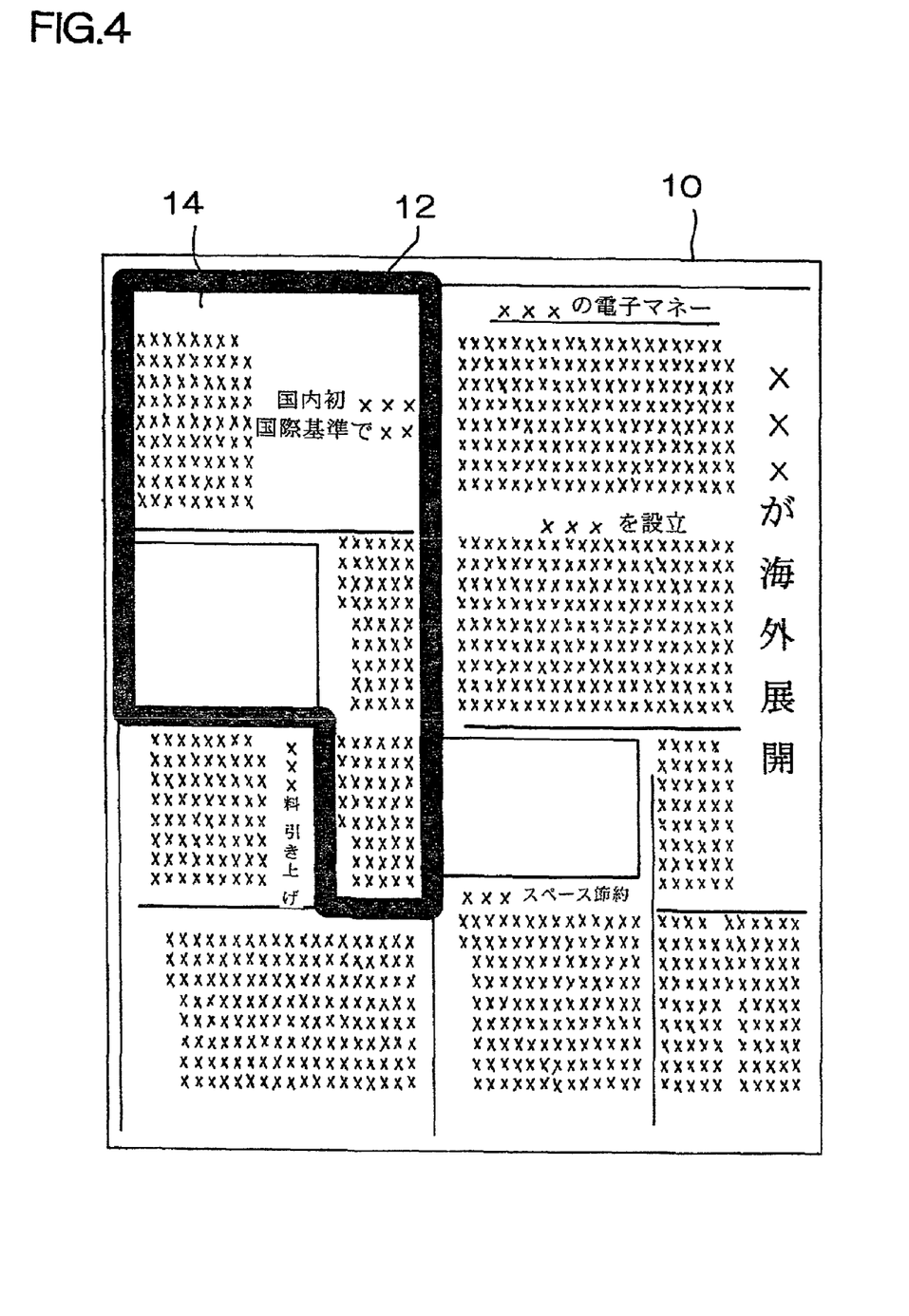
FIG. 4 shows pre-scan image data.

In step S102, a determination is made as to whether or not a mark has been detected in the pre-scan image data. At this time, the mark detecting section 171 detects a mark 12 comprising a thick-line frame in the pre-scan image data 10 as shown in FIG. 4. When a mark is not detected (step S102: NO), the process of step S103 is executed, whereas when a mark is detected (step S102: YES), the process of step S104 is executed. This mark is added to the document by the user beforehand using a marker such as a felt-tip pen or the like. The user marks at least an area containing a headline and body text corresponding to the headline.

In step S103, a screen inviting the user to attach a mark to the document is displayed on the touch panel display of the operation unit 140. In this case the user appends a mark on the document, and the document block extraction process is again executed.

On the other hand, in step S104, the coordinate value of each apex positioned in the angles or corners of the document block 14 circumscribed by the mark 12 detected by the mark detecting section 171 is transmitted to the scanner engine 180. That is, in the present embodiment, an area specified by the user is extracted as a document block 14 to be processed. However, the method for extracting the document block 14 is not limited to this method. For example, an area containing at least a headline and body text corresponding to this headline may be automatically extracted as a document block 14 based on an image detected by well-known methods for detecting a character image equivalent to a headline, a character image equivalent to the body text, image equivalent to ruled lines and the like.

In step S105, the start of the main scan of the document is specified. At this time, the scanner engine 180 sets the range specified by the coordinate values of each apex fed back by the mark detecting section 171 as the range of the main scan, and executes the main scan. In this way the document block 14 is extracted. The main scan image data within the document block 14 output from the scanner engine 180 are input to the image processing section 172.

Figure 5:
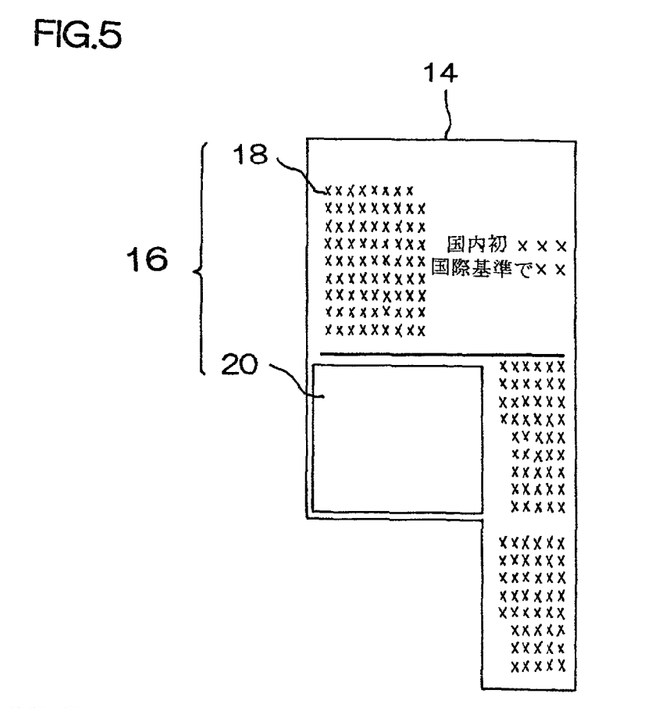
FIG. 5 shows document image data.

In step S106, various image processing is executed by the image processing section 172. Specifically, the image processing section 172 subjects the main scan image data to image processing such as noise elimination, skew correction, vertical/horizontal detection, character enhancement and the like to obtain document image data 16 (refer to FIG. 5). The document image data 16 output from the image processing section 172 are input to the area discriminating section 173.

Figure 6:
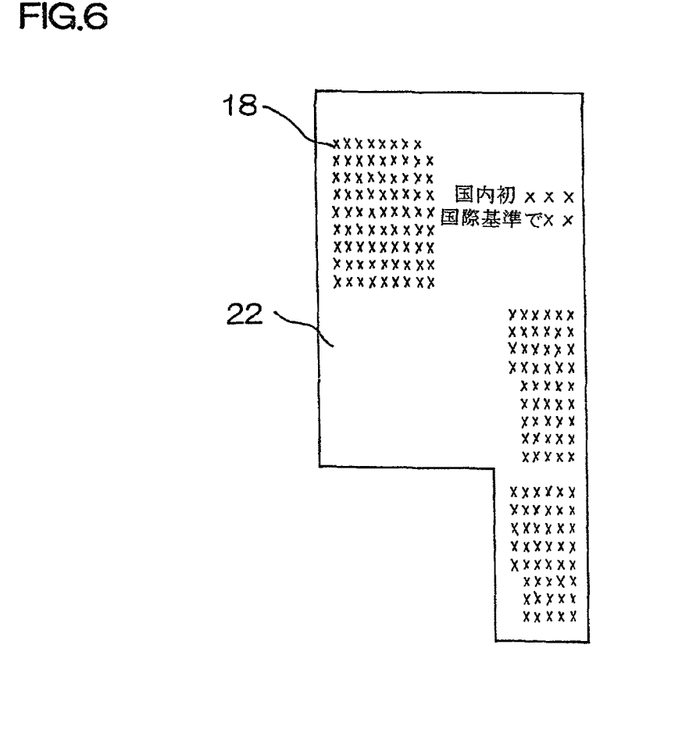
FIG. 6 shows character image data.
Figure 7:
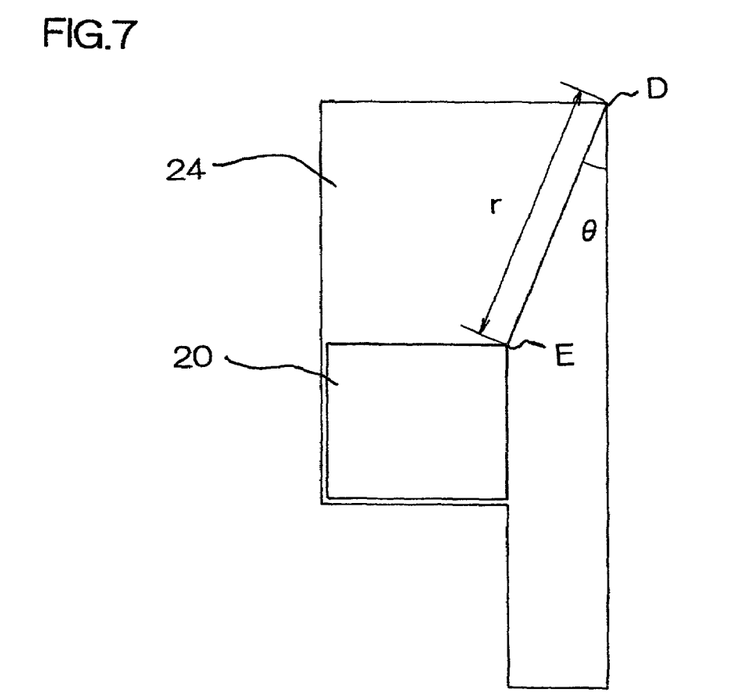
FIG. 7 shows photographic image data.

In step S107, an area discrimination process is executed by the area discriminating section 173. Specifically, the area discriminating section 173 discriminates a character image area 18 containing a character image, and a photographic image area 20 containing a photographic image (including patterns). Since the area discriminating method is well-known art, details are abbreviated. Further, the area discriminating section 173 extracts a character image area 18 to generate image data 22 (refer to FIG. 6), and extracts photographic image area 20 to generate photographic image data 24 (refer to FIG. 7)

In step S108, the document image data 16, character image data 22, and photographic image data 24 output from the area discriminating section 173 are stored in the RAM 130. When photographic image data 24 are not present, only the document image data 16 are stored in RAM 130.

Figure 3:
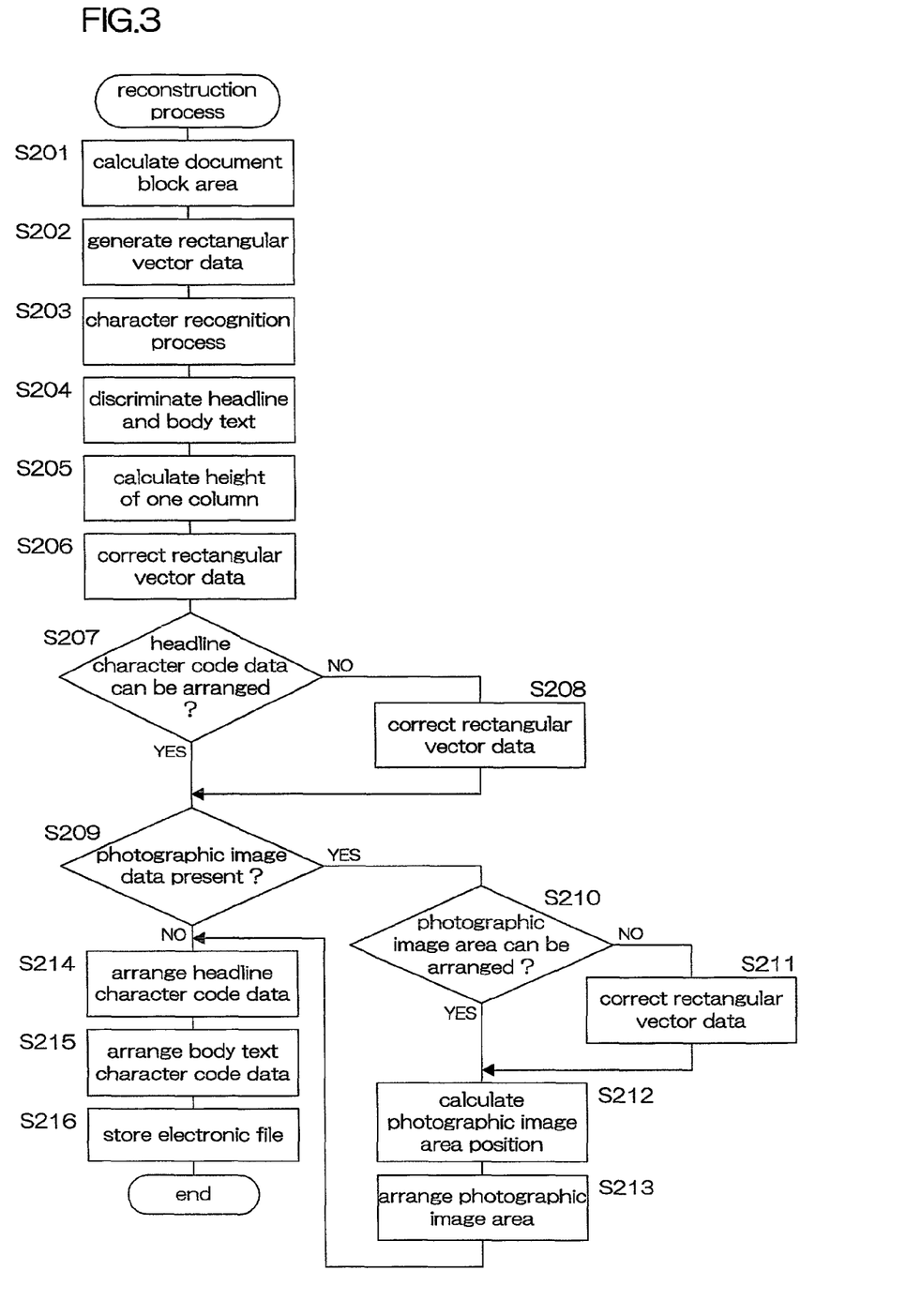
FIG. 3 is a flow chart showing the sequence of the reconstruction process of the document block and character code data.

The sequence of the reconstruction process for the document block and character code data is described below using the flow chart of FIG. 3. The content of the flow chart of FIG. 3 is stored as a program in ROM 120, and is executed by the CPU 110.

In step S201, the surface area is calculated for a document block 14 in which the document image data 16 are arranged.

Specifically, the surface area of the document block 14 is calculated from the total number of dots of the document image data 16 stored in RAM 130, and the resolution (dpi) of the scanner engine 180 set beforehand. The surface area of the document block 14 also can be calculated from the coordinate values of each apex positioned in the angles and corners of the document block 14.

Figure 8:
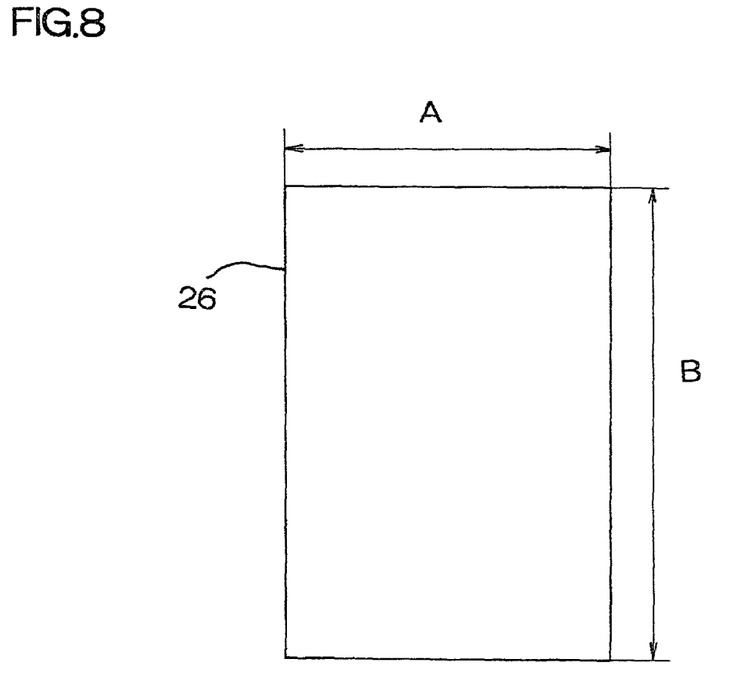
FIG. 8 shows rectangular vector data.

In step S202, the document block 14 is reconstructed in a specific shape. Specifically, rectangular vector data 26 (refer to FIG. 8) of specific aspect ratio and having the same surface area as the document block 14 are generated as a reconstructed document block. The specific aspect ratio may be set, for example, at a horizontal dimension A to a vertical dimension B identical to A4 size, i.e., 210:297. The reconstructed specific shape is not limited to rectangular, since optional shapes may be used insofar as the shape is coherent and easily read. The generated rectangular vector data 26 are stored in RAM 130.

In step S203, the character image data (document image data) stored in RAM 130 is subjected to a character recognition process to obtain character code data. The character code data includes the font size. The character recognition process also can be executed before generating the rectangular vector data.

In step S204, the headline and body text are discriminated in the character code data. The frequency of appearance is calculated for each font size in the character code data, and data having a font size greater than a specific value and a frequency less than a specific value is discriminated as the character code data of the headline, and text data having a font size less than the specific value and a frequency greater than the specific value is discriminated as the character code data of the body text. Moreover, the method of discriminating the headline and body text is not limited to this method.

In the character recognition process, format paragraph ends may be identified by appending a carriage return code directly after a period symbol [.] when one or more spaces occur after a period symbol [.] positioned at the end of a line of character code data of the body text.

In step S205, the height of one column (when body text is written vertically) of the multiple columns formed within the document block 14 is calculated. Although the present example describes body text written vertically, the present invention also is applicable to body text written horizontally. The height of one column of the multiple columns can be calculated, for example, from the font size of the obtained character code data, and the number of characters per column of the multiple columns.

Figure 9:
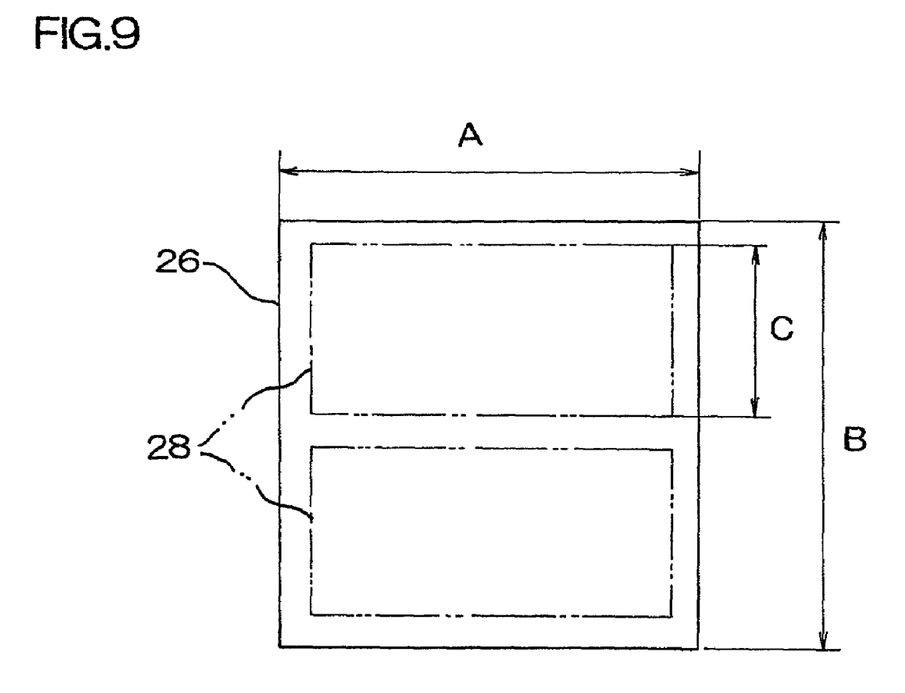
FIG. 9 shows corrected rectangular vector data.

In step S206, the vertical dimension B of the rectangular vector data 26 is corrected to a length of an approximate natural integer multiple of the height C of one column of the multiple columns 28 (refer to FIG. 9). In this way rectangular vector data 26 are obtained without wasteful white space while maintaining the height of one column of the multiple columns in the document. At this time the corrected vertical dimension is corrected to a value nearest the vertical dimension of the initial rectangular vector data 26 shown in FIG. 8. Then, the horizontal dimension A is corrected in accordance with the correction of the vertical dimension B so as to maintain the surface area of the initial rectangular vector data 26. The corrected rectangular vector data 26 are again stored in RAM 130.

In step S207, a determination is made as to whether or not the character code data of the headline can be arranged within the corrected rectangular vector data 26. Specifically, the horizontal length and the vertical length of the headline character code data are compared to the horizontal dimension A and the vertical dimension B of the corrected rectangular vector data 26. When the character code data of the headline protrude from the rectangular vector data 26 (step S207: NO), the process of step S208 is executed, whereas when the character code data of the headline can be arranged within the rectangular vector data 26 (step S207: YES), the process of step S209 is executed.

In step S208, the rectangular vector data 26 are again corrected in accordance with the size of the headline character code data, and again stored in RAM 130. At this time the rectangular vector data 26 is enlarged only in the dimension in the direction (vertical or horizontal) in which the headline character code data protrudes.

On the other hand, in step S209, a determination is made as to whether or not photographic image data 24 are stored in RAM 130. When photographic image data 24 are present (step S209: YES), the process of step S210 is executed, whereas when photographic image data 24 are not stored in RAM 130 (step S209: NO), the process of step S214 is executed.

In step S210, a determination is made as to whether or not the photographic image area 20 in the photographic image data 24 can be arranged within the corrected rectangular vector data 26. Specifically, the horizontal length and vertical length of the photographic image area 20 are respectively compared to the horizontal dimension A and vertical dimension B of the corrected rectangular vector data 26. When the photographic image area 20 protrudes from the rectangular vector data 26 (step S210: NO), the process of step S211 is executed, whereas when the photographic image area 20 can be arranged within the rectangular vector data 26 (step S210: YES), the process of step S212 is executed.

In step S211, the rectangular vector data 26 are again corrected in accordance with the size of the photographic image area 20, and again stored in RAM 130. At this time the rectangular vector data 26 is enlarged only in the dimension in the direction (vertical or horizontal) in which the photographic image area 20 protrudes.

On the other hand, in step S212, the position of the photographic image area 20 in the photographic image data 24 is calculated. Specifically, the top right position of the photographic image data 24 (identical to the top right point of the document image data 16) is set as a standard, and the coordinates (distance r, direction θ) of the top right-most position of the photographic image area 20 are calculated (refer to FIG. 7).

Figure 10:
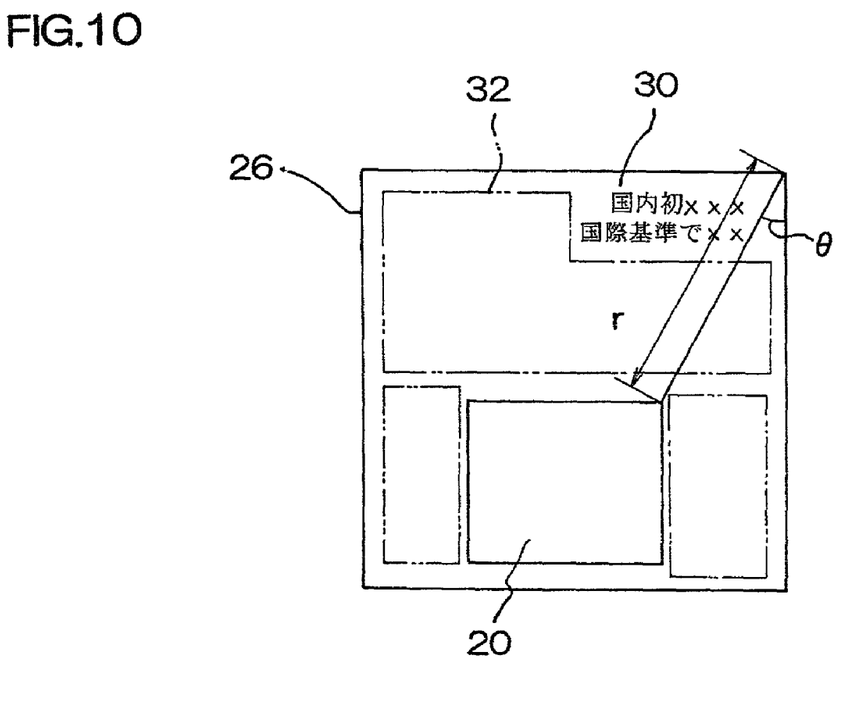
FIG. 10 illustrates the method for arranging data within the rectangular vector data.

In step S213, first, the photographic image area 20 is arranged within the rectangular vector data 26 in accordance with the calculated position, as shown in FIG. 10. In this way the layout of the original document is maintained to a degree.

In step S214, the headline character code data 30 are arranged at a specific position, specifically at the top right, within the rectangular vector data 26. In this way the readability is improved. When the body text is written horizontally, the headline character code data 30 is arranged at the top left.

In step S215, the body text character code data 32 are arranged within the rectangular vector data 26. At this time the body text character code data 32 are sequentially arranged from top right to bottom left in the white space corresponding to the multiple columns 28 outside the areas in which the photographic image area 20 and the headline character code data 30 are arranged.

Figure 11:
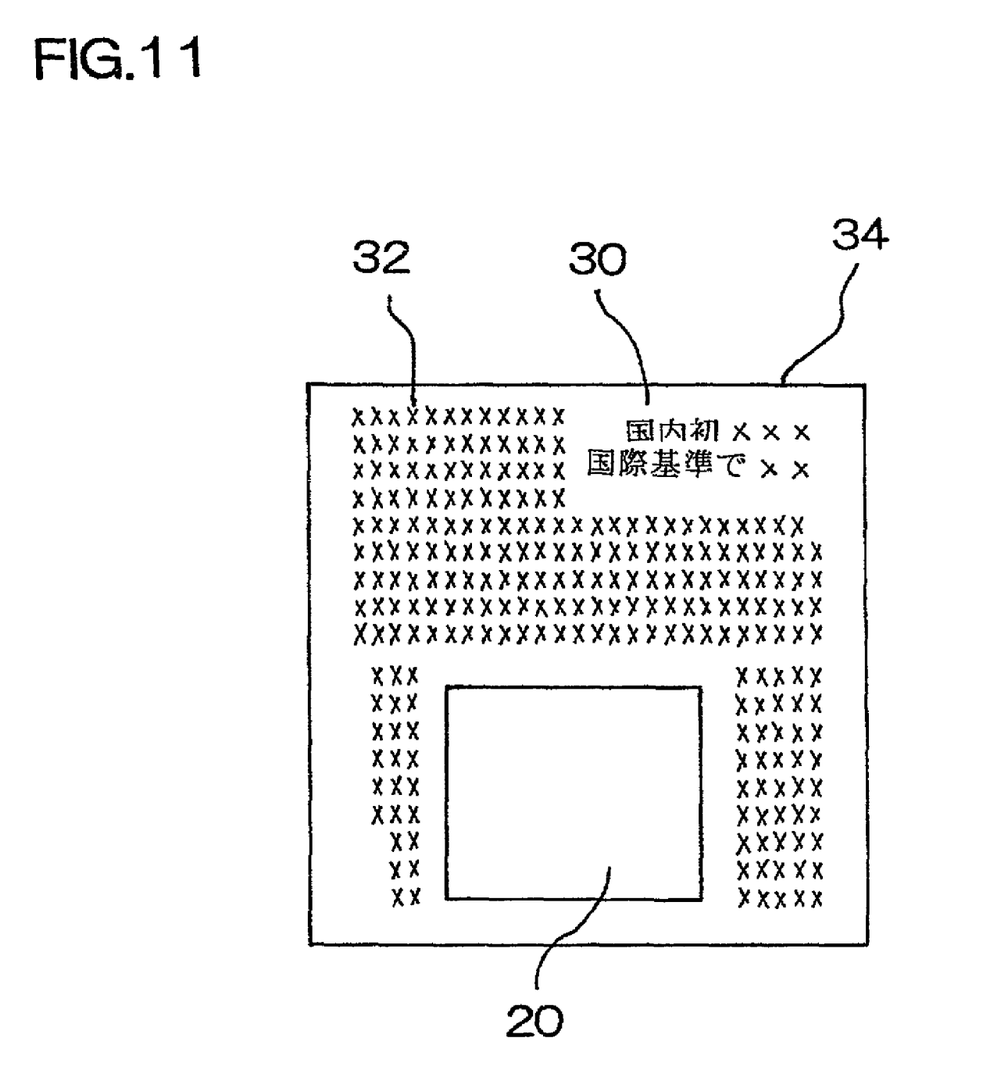
FIG. 11 shows completed document data.

In step S216, the document data 34 (refer to FIG. 11) which has been completed by arranging the headline character code data 30, the body text character code data 32, and the photographic image area 20 within the rectangular vector data 26, are stored on hard disk 150 as an electronic file. The document data 34 also may be saved on a flexible disk or the like via the recording media drive 160.

According to the above embodiment, a document block 14 is extracted from among image data obtained by optically reading the image of a document such as a newspaper, magazine or the like using a scanner engine 180, character code is recognized from the character image within the document block 14, rectangular vector data 26 are generated to reconstruct the shape of the document block 14, and the character code data corresponding to the recognized character code are laid out within the rectangular vector data 26. Accordingly, specific document data are extracted from among image data obtained by reading a document such as a newspaper, magazine or the like, such that the document data can be readily obtained which are easily readable and effectively adhered without waste in, for example, a file region of definite form.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined-by the appended claims unless they depart therefrom.

Figure 12A:
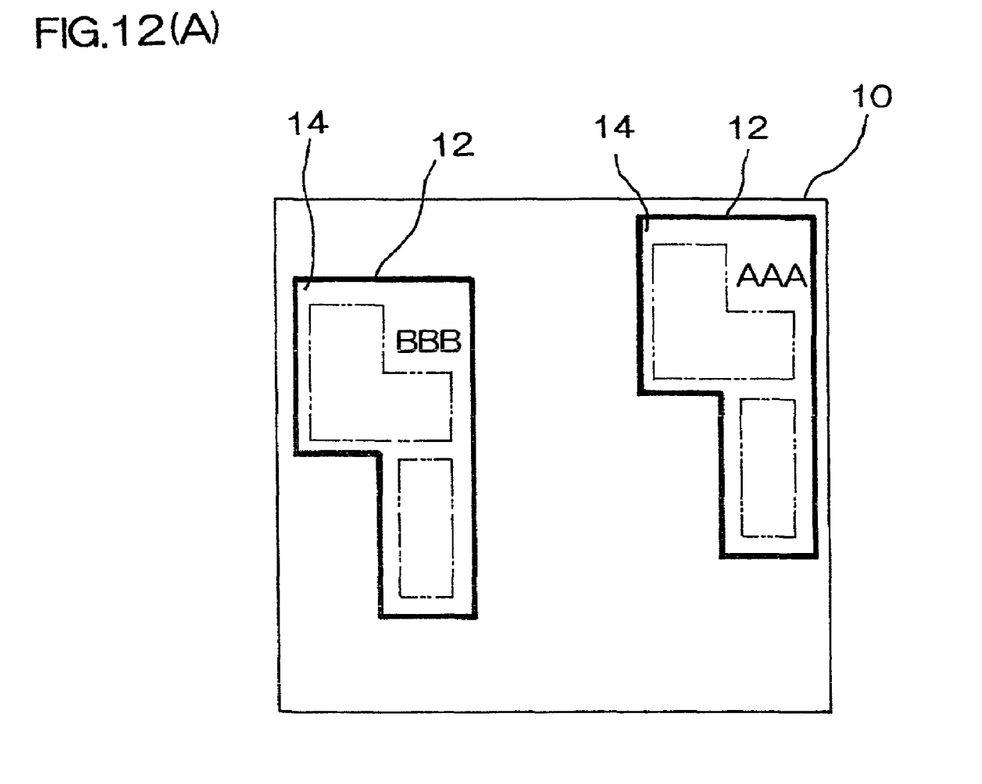
FIG. 12 illustrates processing when a plurality of document blocks exist.
Figure 12B:
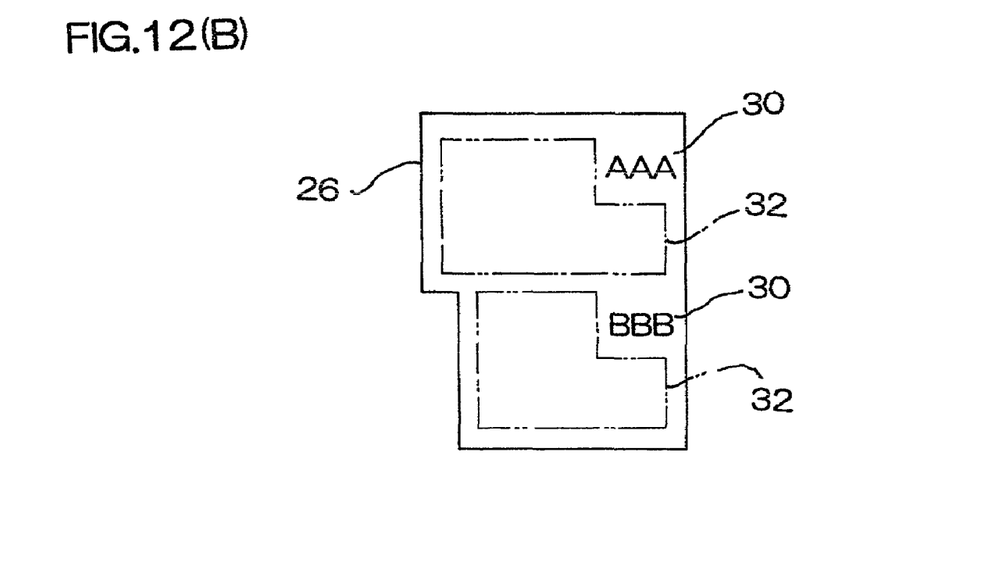

For example, although the present invention has been described in terms of a single document block 14 circumscribed by a mark 12 in pre-scan image data 10 of a read document in the above embodiments, it is to be understood that the present invention is not limited to this arrangement. The present invention also is applicable to instances of a plurality of document blocks, as shown in FIG. 12(A). In this case the surface area of the document block is determined as the sum of the surface areas of each document block 14. Then, as shown in FIG. 12(B) the headline character code data 30, the body text character code data 32 and the like of each document block are, for example, sequentially arranged in the white space of the rectangular vector data 26 from the top right to the bottom left (when the main text is written vertically). This layout method is not specifically limited. According to this example, a needed document can be collected in a single document even when it exists in a plurality of division within a document, thereby the document data can be easily obtained which are readable and more effectively adhered.

In the above embodiments, the circumscription of a document block 14 is specified by a mark 12 and extracted, however, all document blocks may be automatically extracted from image data of a read document comprising the entirety of one page such as a newspaper, magazine or the like.

The image processing device also may have, in addition to the structure shown in FIG. 1, an interface for sending and receiving data between the image processing device and other information devices. In this way a generated document data 34 (refer to FIG. 11) may be transmitted to another information device such as a computer, printer or the like.

The image processing device also may have, in addition to the structure shown in FIG. 1, a printer engine for printing data on recording substrate such as cut paper, OHP transparencies, roll paper and the like. In this way a generated document data 34 may be printed on recording substrate.

The components comprising the image processing device and the image processing method of the present invention may be realized by special hardware circuits or programmed computer. Furthermore, when the present invention is realized by programmed computer, the programs which operate the computer may be provided on a computer-readable recording medium (e.g., floppy disk, CD-ROM and the like).

In this case a program recorded on a computer-readable recording medium normally is transferred to and recorded on a hard disk. The program also may be provided as independent application software. Furthermore, the program may be incorporated in the software of the computer as one function of the computer.

What is claimed is:

1. A digital image processing device comprising:
    pre-scan execution means for executing a pre-scan of a document, on which document the user has marked a plurality of document blocks, and creating pre-scan image data from which pre-scan image data the plurality of document blocks that is marked by the user are detected;
    extraction means for extracting the plurality of document blocks that are digital image data representing a portion of the scanned document, the scanned document having document images and a background, the plurality of document blocks include document image data and background image data, the document image data represents some of the document images on the scanned document, wherein all the document image data in the extracted plurality of document blocks represents fewer document images than all the document images that are present on the scanned document;
    generating means for generating character code data for character image data within the plurality of document blocks;
    reconstruction means for reconstructing the plurality of document blocks into a single document block in a specific shape based on the extracted plurality of document blocks; and
    layout means for laying out the character code data corresponding to the character code generated by the generating means within the reconstructed document block to create a layout image.

2. A digital image processing device as claimed in claim 1, further comprising file generation means for generating an electronic file storing the character code data laid out by the layout means.

3. A digital image processing device as claimed in claim 1, further comprising a printer for printing the character code data laid out by the layout means on a recording substrate.

4. A digital image processing device as claimed in claim 1, wherein the detecting means includes a reader for optically scanning the document.

5. A digital image processing device as claimed in claim 1, wherein the plurality of document blocks is a marked portion of the document.

6. A digital image processing device as claimed in claim 1, wherein the plurality of document blocks is a headline and body text of the document.

7. A digital image processing device as claimed in claim 1, wherein the plurality of document blocks also includes a photographic image area that is extracted and laid out with the character code data.

8. A digital image processing device as claimed in claim 1, wherein an area of the reconstructed document block is the same as a total area of the extracted document block.

9. A digital image processing device as claimed in claim 1, wherein the character code includes at least font size.

10. A digital image processing device comprising:
    pre-scan execution means for executing a pre-scan of a document, on which document the user has marked a plurality of document blocks, and creating pre-scan image data from which pre-scan image data the plurality of document blocks that is marked by the user are detected;

extraction means for extracting the document block that is digital image data representing a portion of the scanned document, the scanned document having document images and a background, the document block includes document image data and background image data, the document image data represents some of the document images on the scanned document, wherein all the document image data in the extracted document block represents fewer document images than all the document images that are present on the scanned document;

generating means for generating character code data for character image data within the document block;

reconstruction means for reconstructing the document block into a single document block in a specific shape based on the extracted document block; and layout means for laying out the character code data corresponding to the character code generated by the generating means within the reconstructed document block to create a layout image;

wherein the layout image includes a character image of a headline and a character image of body text corresponding to the headline.

11. A digital image processing device as claimed in claim 10, further comprising headline character arrangement means for arranging character code data corresponding to the character image of the headline at a specific position within the reconstructed document block.

12. A digital image processing device comprising:

pre-scan execution means for executing a pre-scan of a document, on which document the user has marked a plurality of document blocks, and creating pre-scan image data from which pre-scan image data the plurality of document blocks that is marked by the user are detected;

extraction means for extracting the document block that is digital image data representing a portion of the scanned document, the scanned document having document images and a background, the document block includes document image data and background image data, the document image data represents some of the document images on the scanned document, wherein all the document image data in the extracted document block represents fewer document images than all the document images that are present on the scanned document;

generating means for generating character code data for character image data within the document block;

reconstruction means for reconstructing the document block into a single document block in a specific shape based on the extracted document block; and layout means for laying out the character code data corresponding to the character code generated by the generating means within the reconstructed document block to create a layout image;

wherein the reconstruction means adjusts a vertical or horizontal dimension of the document block to a length approximating a natural integer multiple of a length of one column of multiple columns formed within the document block.

13. A computer readable medium for storing a program that causes a computer to:

execute a pre-scan of a document, on which document the user has marked a plurality of document blocks, and creating pre-scan image data from which pre-scan image data the plurality of document blocks that is marked by the user are detected;

extract the plurality of document blocks that are digital image data representing a portion of the scanned document, the scanned document having document images and a background, the plurality of document blocks include document image data and background image data, the document image data represents some of the document images on the scanned document, wherein all the document image data in the extracted plurality of document blocks represents fewer document images than are present in the scanned document;

generate character code data for character image data within the plurality of document blocks;

reconstruct the plurality of document blocks into a single document block in a specific shape based on the plurality of extracted document blocks; and laying out the generated character code data within the reconstructed document block to create a layout image.

14. The computer readable medium as claimed in claim 13, further comprising a step of generating an electronic file storing the character code data laid out at the step of laying out.

15. The computer readable medium as claimed in claim 13, further comprising a step of printing on a recording substrate the character code data laid out at the step of laying out.

16. The computer readable medium as claimed in claim 13, wherein the plurality of document blocks is a marked portion of the document.

17. The computer readable medium as claimed in claim 13, wherein the plurality of document blocks is a headline and body text of the document.

18. The computer readable medium as claimed in claim 13, wherein the plurality of document blocks also includes a photographic image area that is extracted and laid out with the character code data.

19. The computer readable medium as claimed in claim 13, wherein an area of the reconstructed document block is the same as a total area of the extracted document blocks.

20. A computer readable medium as claimed in claim 13, wherein the character code includes at least font size.

21. A computer readable medium for storing a program that causes a computer to:

execute a pre-scan of a document, on which document the user has marked a plurality of document blocks, and creating pre-scan image data from which pre-scan image data the plurality of document blocks that is marked by the user are detected;

extract the document block that is digital image data representing a portion of the scanned document, the scanned document having document images and a background, the document block includes document image data and background image data, the document image data represents some of the document images on the scanned document, wherein all the document image data in the extracted document block represents fewer document images than are present in the scanned document;

generate character code data for character image data within the document block;

reconstruct the document block into a single document block in a specific shape based on the extracted document block; and laying out the generated character code data within the reconstructed document block to create a layout image;

wherein the layout image includes a character image of a headline and a character image of body text corresponding to the headline.

22. The computer readable medium as claimed in claim 21, wherein the program further comprises a step of arranging the character code data corresponding to the character image of the headline at a specific position within the reconstructed document block.

23. A computer readable medium for storing a program that causes a computer to:
   execute a pre-scan of a document, on which document the user has marked a plurality of document blocks, and creating pre-scan image data from which pre-scan image data the plurality of document blocks that is marked by the user are detected;
   extract the document block that is digital image data representing a portion of the scanned document, the scanned document having document images and a background, the document block includes document image data and background image data, the document image data represents some of the document images on the scanned document, wherein all the document image data in the extracted document block represents fewer document images than are present in the scanned document;
   generate character code data for character image data within the document block;
   reconstruct the document block into a single document block in a specific shape based on the extracted document block; and
   laying out the generated character code data within the reconstructed document block to create a layout image;
   wherein at the step of reconstructing a vertical or horizontal dimension of the document block is adjusted to a length approximating a natural integer multiple of a length of one column of multiple columns formed within the document block.

24. A digital image processing method comprising the steps of:
   executing a pre-scan of a document, on which document the user has marked a plurality of document blocks, and creating pre-scan image data from which pre-scan image data the plurality of document blocks that is marked by the user are detected;
   extracting the plurality of document blocks that are digital image data representing a portion of the scanned document, the scanned document having document images and a background, the plurality of document blocks includes document image data and background image data, the document image data represents some of the document images on the scanned document, wherein all the document image data in the extracted plurality of document blocks represents fewer document images than are present in the scanned document;
   generating character code data for character image data within the plurality of document blocks;
   using an electronic circuit to reconstruct the plurality of document blocks into a single document block in a specific shape based on the extracted plurality of document blocks; and
   using an electronic circuit to lay out the generated character code data within the reconstructed document block to create a layout image;
   wherein extraction means extracts a plurality of document blocks, and reconstruction means arranges the plurality of extracted document blocks into a single block reconstructed to the specific shape.

25. A digital image processing method as claimed in claim 24, wherein the plurality of document blocks is a marked portion of the document.

26. A digital image processing method as claimed in claim 24, wherein the plurality of document blocks is a headline and body text of the document.

27. A digital image processing method as claimed in claim 24, wherein the plurality of document blocks also includes a photographic image area that is extracted and laid out with the character code data.

28. A digital image processing method as claimed in claim 24, wherein an area of the reconstructed document block is the same as a total area of the extracted document blocks.

29. A digital image processing method as claimed in claim 24, wherein the character code includes at least font size.

30. A digital image processing device comprising:
   a detection circuit for executing a pre-scan of a document, on which document the user has marked a plurality of document blocks, and creating pre-scan image data from which pre-scan image data the plurality of document blocks that is marked by the user are detected;
   an extraction circuit adapted to extract the plurality of document blocks that are digital image data representing a portion of the scanned document, the scanned document having document images and a background, the plurality of document blocks includes document image data and background image data, the document image data represents some of the document images on the scanned document, wherein all the document image data in the extracted plurality of document blocks represents fewer document images than are present in the scanned document;
   a generating circuit adapted to generate character code data from character image data within the plurality of document blocks;
   a reconstruction circuit adapted to reconstruct the plurality of document blocks into a single document block in a specific shape based on the extracted plurality of document blocks; and
   a layout circuit adapted to lay out the character code data within the reconstructed document block to create a layout image.

31. A digital image processing device as claimed in claim 30, wherein an area of the reconstructed document block is the same as a total area of the extracted document blocks.

32. A digital image processing device as claimed in claim 30, wherein the character code includes at least font size.

33. A digital image processing device comprising a circuit for:
   executing a pre-scan of a document, on which document the user has marked a plurality of document blocks, and creating pre-scan image data from which pre-scan image data the plurality of document blocks that is marked by the user are detected;
   extracting the plurality of document blocks that are digital image data representing a portion of the scanned document, the plurality of document blocks includes document image data and background image data, the document image data representing some of the document images on the scanned document, wherein all the document image data in the extracted plurality of document blocks represents fewer document images than are present in the scanned document;
   generating character code data from character image data within the plurality of document blocks;

reconstructing the plurality of document blocks into a single document block in a specific shape based on the plurality of extracted document blocks; and laying out the character code data within the reconstructed document block to create a layout image.

34. A digital image processing device as claimed in claim 33, wherein the character code includes at least font size.

35. A digital image processing device comprising a circuit for:

executing a pre-scan of a document, on which document the user has marked a plurality of document blocks, and creating pre-scan image data from which pre-scan image data the plurality of document blocks that is marked by the user are detected;

extracting the plurality of document blocks that are digital image data representing a portion of the scanned document, the scanned document having document images and a background, the plurality of document blocks includes document image data and background image data, the document image data represents some of the document images on the scanned document, wherein all the document image data in the plurality of document blocks represents fewer document images than are present in the scanned document, the plurality of document blocks being identified by the perimeter and containing a specific image to be processed, the perimeter being established by the user beforehand;

generating character code data for character images within the plurality of document blocks;

reconstructing the plurality of document blocks into a single document block in a specific shape based on the plurality of extracted document blocks; and laying out the character code data within the reconstructed document block to create a layout image.

36. The digital image processing device of claim 35, wherein the perimeter is established by the user using a drawing instrument.

37. A digital image processing device as claimed in claim 35, wherein the character code includes at least font size.

* * * * *